United States Patent [19]
Fox, II

[11] Patent Number: 5,340,071
[45] Date of Patent: Aug. 23, 1994

[54] SHADE SAVER

[76] Inventor: Douglas O. Fox, II, 1059D Circle Dr., Dover, Del. 19901

[21] Appl. No.: 917,393

[22] Filed: Jul. 23, 1992

[51] Int. Cl.5 ............................................. A47B 96/06
[52] U.S. Cl. .................................. 248/231.8; 224/312; 248/229; 248/902
[58] Field of Search ...................... 248/214, 229, 231.8, 248/316.7, 902; 224/277, 42.45 R, 312; 24/563, 531

[56] References Cited

U.S. PATENT DOCUMENTS

| | | | |
|---|---|---|---|
| 942,366 | 12/1909 | Deeter | 24/563 X |
| 1,520,739 | 12/1924 | Zetlitz | 24/563 |
| 1,958,934 | 5/1934 | Williams | 24/531 X |
| 2,306,174 | 12/1942 | Mallory | 248/229 |
| 2,382,875 | 8/1945 | Handley | 224/312 X |
| 2,547,101 | 4/1951 | Uttz | 224/312 X |
| 2,609,578 | 9/1952 | Andary | 248/229 X |
| 3,140,781 | 7/1964 | Rothgart | 224/312 X |
| 4,103,860 | 8/1978 | Haas | 224/312 X |
| 4,844,311 | 7/1989 | Kalen | 224/312 |

FOREIGN PATENT DOCUMENTS 803278  10/1958  United Kingdom ............... 224/312

Primary Examiner—J. Franklin Foss
Attorney, Agent, or Firm—John P. Halvonik

[57] ABSTRACT

The invention is windshield sunshade storing device for confining a windshield sunshade alongside the interior sunvisor of an automobile. The storing device is an S shaped clip with a pair of surfaces that attach to a sun visor and another pair of surfaces that secure the folded up sunshade. Two or more clips may be used to confine the sunshade and hold it in place.

4 Claims, 2 Drawing Sheets

SHADE SAVER

FIELD OF INVENTION

BACKGROUND OF THE INVENTION

The invention relates to the field of windshield sunscreens and to a support structure that may be used to store a sunscreen when not in use by securing it in a folded up position against the auto sunvisor.

DESCRIPTION OF THE PRIOR ART

While there are sunshades and clipping devices, none to applicant's knowledge are used to store the commonly used windshield sun screen when not in use.

SUMMARY OF THE INVENTION

The invention is a sunshade storing apparatus for holding windshield sunshades (or sunscreens) in place against the inside surface of the windshield. The storage device is a flat surface bent along two lines to form at least three distinct surfaces with an "S" shaped cross section. Each surface is parallel to the other two and in connection with the other surfaces along the bending lines of the apparatus. Attachment means exist on the surface of the clip to attach to a portion of the sunvisor and to the sunshade itself.

It is an object of the invention to provide an easy to use sunshade storing means to secure windshield sunscreens alongside the sunvisors of automobiles.

Another object of the invention is to provide a means to secure sunscreens against the sunvisor of an auto without the use of adhesives or permanent fixtures.

Yet another objective is to provide a storage means for windshield sunscreens that can be readily relocated within the interior of an automobile to provide a plurality of storage positions.

Other objectives of the invention will become apparent to those skilled in the art once the invention has been shown and described.

DESCRIPTION OF THE PREFERRED EMBODIMENT

The securing apparatus that is the subject of this application is of one piece construction and is folded a number of times (at least two) to create a piece with S shaped cross section and a series of parallel surfaces (at least three) corresponding to the aforementioned folds. Of the parallel surfaces, there must necessarily be one surface at the front 1 and one at the back 3 of the apparatus as viewed from the side, see FIG. 2.

Figure 6:
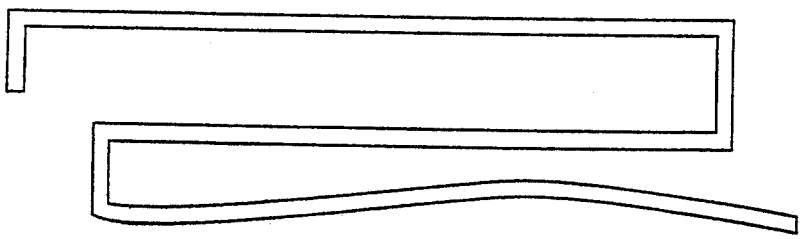
FIG. 6 shows bumps used as additional securing means.
Figure 7:
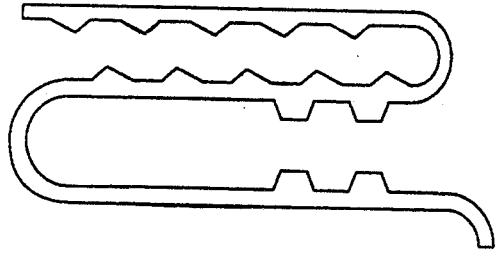
FIG. 7 shows side view of notched gripping portions.
Figure 8:
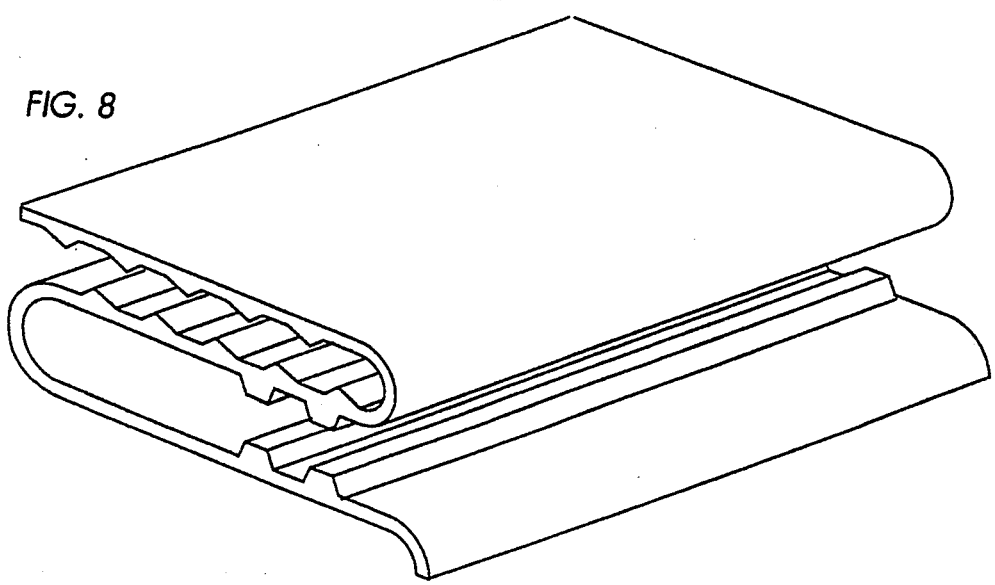
FIG. 8 shows top side view of notched gripping portions.

Because the construction is essentially symmetrical, the front surface could function as the rear surface and visa versa. The terms "front" and "rear" surface are merely conventions. Both the front and rear surface may have an additional attachment means e.g. the small bumps shown in FIG. 6 and/or the notched portions shown in FIGS. 7 and 8.

Figure 2:
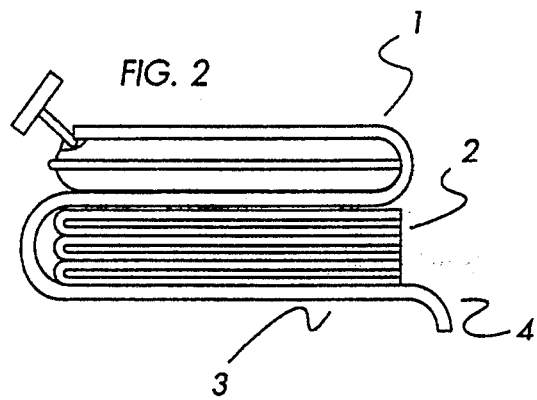
FIG. 2 shows side view of clip, sunvisor and sunshade.
Figure 3:
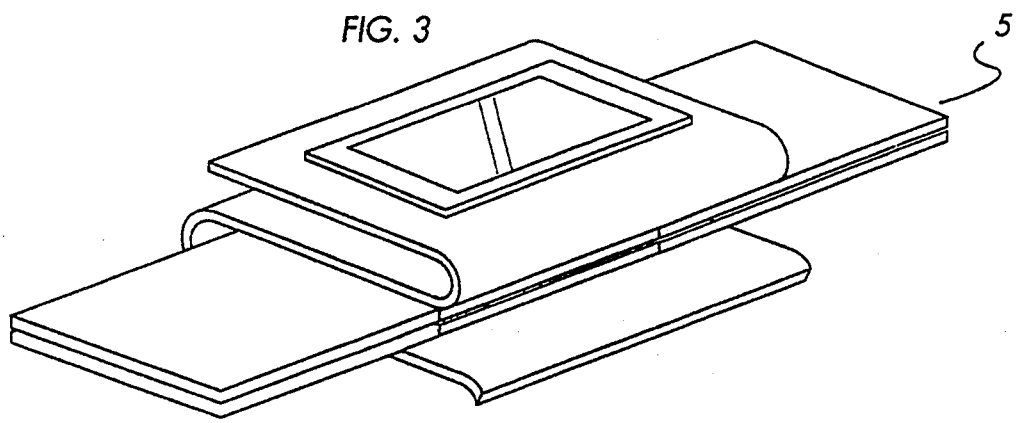
FIG. 3 shows the sunvisor in connection with the clip.
Figure 4:
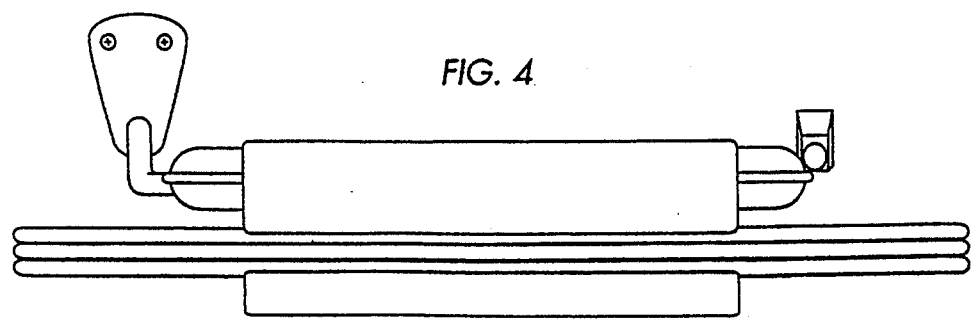
FIG. 4 shows top view of clip-visor-screen system.
Figure 5:
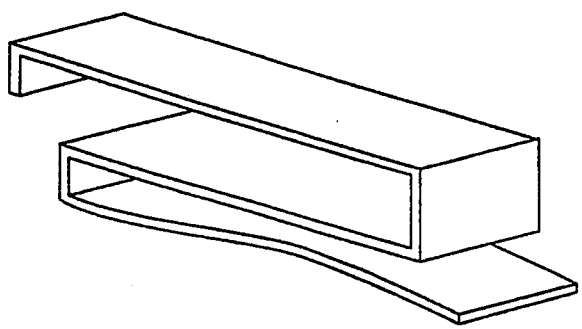
FIG. 5 shows alternate smaller sized clip construction.
Figure 5:
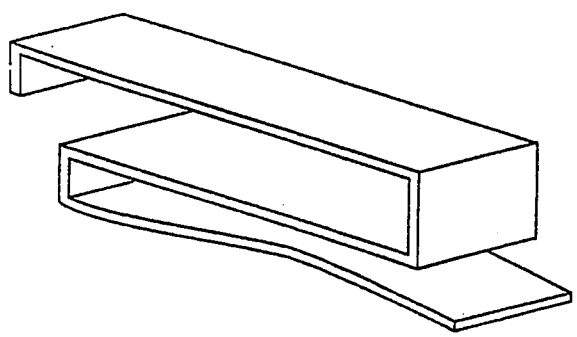

Refer to FIG. 2. The device comprises three parallel surfaces 1,2, and 3 which may be designated the front, middle and rear surfaces. When seen in cross section, the device has an S shape with a pair of spaces in between the surfaces. One of these spaces is used to hold the sunscreen and one is used to attach to the sunvisor.

Connecting the front and middle surface, and the middle and rear surfaces, are portions of the surfaces which correspond to the lines along which the apparatus is bent. For instance, the top edges of the front and middle surfaces are joined in FIG. 2 and the bottom edges of the middle and rear surfaces are joined in the same figure. As the apparatus is preferably of one piece construction, the edges are indistinguishable from the rest of the surface and they could also be termed the top edge of the rear surface and the bottom edge of the front surface.

Figure 1:
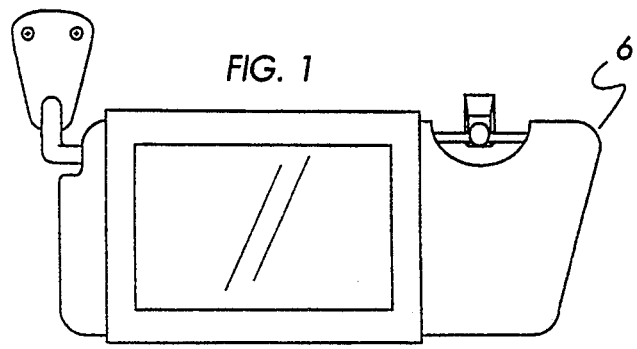
FIG. 1 shows front view with optional mirror.

As one views the clip, the front surface is at the top of FIG. 2 and is that surface which is seen contacting the sunvisor 6 in FIG. 1. The area in the clip between the front surface and the middle surface 2 is slid over the auto sunvisor from the bottom edge of the sunvisor In this way, the area between the middle surface and the rear surface 3 faces downward so that the sunscreen 5 can be slid upward into this opening between the surfaces.

With the clip in place on the sunvisor, the sunscreen is folded up and placed within the middle and rear surfaces of the apparatus. It may be secured by means of attaching means on one or both of the surfaces. These may be e.g. the small bumps shown in FIG. 6 or the ridges shown in FIG. 7-8.

The screen is hung securely and without the need for adhesives or VELCRO, etc. that would make for permanent or semi-permanent fixtures in the interior of the auto.

That surface which contacts the sunscreen (the front or rear depending on how one views the surfaces) may also have a raised flange 4 near the end. In the case where the rear surface connects to the middle portion at its bottom edge, the top edge would be free and it would be this edge that has the raised flange, see FIG. 2.

This raised flange facilitates the placement of the sunscreen 5 into the area between the rear 3 and middle 2 surfaces. It tends to channel the sunscreen into that area when one is placing the sunscreen in place. Note that this may take place behind the sunvisor so the operation of storing the sunscreen within the clip may be done mostly by feel.

There are a number of possible materials out of which the device may be made with an inexpensive and fairly durable material preferred. Aluminum, steel, reinforced fiberglass and plastic are some that come readily to mind. If plastic, the device may be molded into the desired shape and if metal, the apparatus could be bent into shape.

Note that the front and rear surfaces may be mirror images of one another and those features that the front surface has (e.g. mirror, or shade attaching means) could also be on the rear surface and visa versa. The sunscreen could be just as easily attached to the front surface as the rear surface of the invention and the sunvisor could easily attach to the rear or the front surface of the invention.

Optionally, a mirror could be attached to that surface which contacts the sunvisor, the front surface in the drawings. This would enhance the appearance of the clip as well as provide a useful feature in the event that the apparatus covers up a portion of the existing mirror on the visor.

An additional securing means in the form of a tie down strap with a VELCRO portion at the end may be attached to the apparatus as an additional attaching means, see FIG. 9. The strap would be looped through an aperture in one of the surfaces. A corresponding mating portion of VELCRO could be attached to the surface of the visor to facilitate this. Advertising indicia may also be placed on one of the surfaces of the apparatus for additional marketability.

I claim:

1. A windshield sunscreen storage apparatus for the protective confinement of sunshades to an automobile windshield sunvisor comprising: planar shaped member of plastic construction and folded along two parallel fold lines in order to divide said member into front, middle, and rear surfaces, said front and rear surfaces on either side of said middle surface and said front and rear surfaces having edges, said front, middle and said rear surfaces being about parallel to one another so as to define a space between said middle and said rear walls and another space between said middle and said front walls, said spaces of a size adapted to fit relatively firmly around said sunvisor and said sunshade, said front and middle surfaces having notches in said surface in order to provide for frictional fit with said sunshade.

2. The apparatus of claim 1 where said rear surface edge is of rounded construction and said front surface edge is of rounded construction.

3. The apparatus of claim 2 wherein said front surface has a mirrored surface.

4. The apparatus of claim 3 wherein said apparatus has a strap for securing said apparatus to said sunvisor.

* * * * *